May 24, 1960
J. J. PISANI
2,937,757
SKIMMING APPARATUS
Filed Aug. 13, 1956
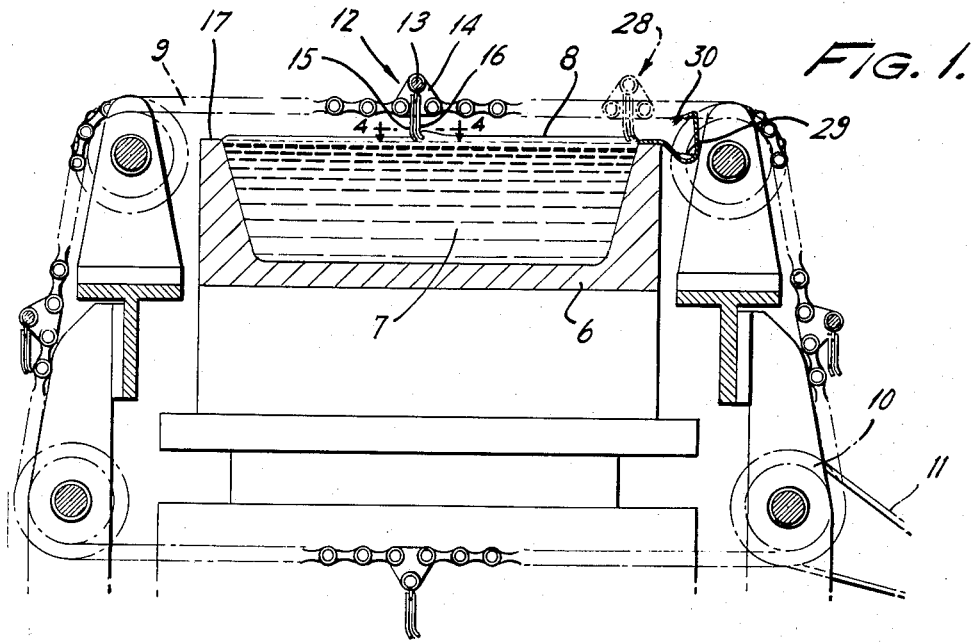
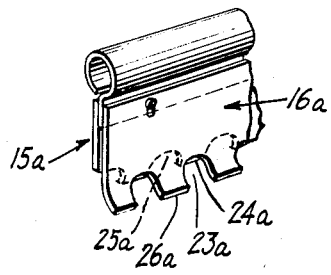
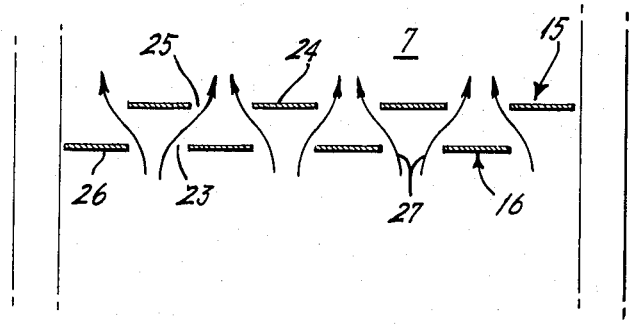
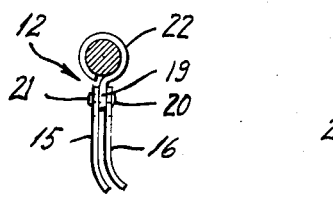
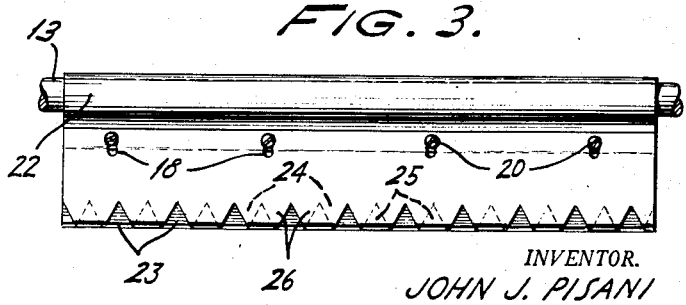
INVENTOR.
JOHN J. PISANI
BY
Carl H. Synnestvedt
AGENT United States Patent Office 2,937,757
Patented May 24, 1960

2,937,757
SKIMMING APPARATUS

John J. Pisani, Haddonfield, N.J., assignor to Philco Corporation, Philadelphia, Pa., a corporation of Pennsylvania Filed Aug. 13, 1956, Ser. No. 603,604
1 Claim. (Cl. 210—526)

This invention relates to apparatus for removing supernatant impurities from a body of liquid.

With the increasing emphasis on automation and its attendant demand for higher production rates, there has evolved, in an endeavor to reduce the cost of mass producing electronic assemblies, a simple way of making electrical connections, to wit, a technique wherein all connections are made simultaneously with a single dip in hot solder. To employ this technique, it is necessary to bring all points of interconnection into one plane. This is done by placing all components on what is commonly known as a printed wiring panel such that all points to be soldered are on one side thereof. Numerous applications employing printed wiring panels have been made feasible by this dip soldering technique. With the increasing tempo of mass production, the time allocated for this phase of operation has been progressively diminished so that at present, only a fraction of a minute is allowed for the entire soldering sequence. There is accordingly a much felt need for means directed at minimizing any extrinsic time consuming actions attendant the soldering operation.

Heretofore, the speed at which any particular panel might be solder dipped was dependent, inter alia, on the rapidity with which oxide accumulations on the surface of the solder bath could be removed, namely the time required for the skimming means to traverse the surface of the solder bath. The removal of the oxides or dross is a necessary prerequisite to the successful soldering of each printed wiring panel. The speed of traverse, however, is intimately associated wtih and limited by the tendency of high speed skimming to set up transient wave formations in the liquid substrate. To effectuate satisfactory soldering, the immersion of the underside of the panel into the solder bath must await subsidence of the undulations induced by the skimming means. Moreover, the use of conventional skimming means results in excessive loss of solder. It has previously been extremely difficult and economically unfeasible to provide skimming means which will remove only the impurities from the surface of a body of liquid, leaving the underlying liquid undisturbed. The customary practice is to insert the skimming blade into the solder bath so that the blade extends into and through the supernatant film of impurities, the blade necessarily extending into the solder substrate in such manner that, when traversing the surface of the solder, the skimming means tends to spoon out appreciable solder resulting in substantial losses.

It is consequently a primary object of this invention to provide for the removal of impurities from the surface of a liquid in a manner conducive to minimal waste of the underlying liquid.

It is further an object to provide apparatus for removing impurities from the surface of a liquid, which mitigates any tendency to set up undulations in the liquid substrate.

A still further object is to provide apparatus for removing dross from the surface of a liquid which obviates the necessity for detailed manual adjustment of the skimming means and which lends itself to simplified maintenance procedures.

These and other objects will become more apparent from the following detailed description and the accompanying drawing in which:

Figure 1 is a sectional side view of skimming apparatus embodying the principles of the present invention;

Figure 2 is a side view of the improved skimmer;

Figure 3 is a front view of the skimming means shown in Figure 2;

Figure 4 is a sectional view of the skimming blades immersed in the solder bath and taken along line 4—4 of Figure 1;

Figure 5 is a fragmentary perspective of an alternate embodiment.

First briefly described, the illustrated embodiment of the invention comprises an arrangement of spaced skimming blades containing serrations along the working edge portions thereof. The blades are immersed in the solder bath so that the serrated portions extend into and through the film of impurities overlying the solder bath. When these blades are set in motion, the cumulative effect of he aggregation of apertures and peninsular elements formed by the aforesaid serrations is to provide a free flow path for the less viscous fluid substrate while simultaneously presenting a substantially imperforate barrier to the supernatant impurities. Moreover, the new skimming means, to prevent the excessive loss of solder during skimming, need not be precisely positioned with respect to the depth of penetration into the solder bath as in prior art devices; the present invention admitting of a considerable degree of latitude with respect to this heretofore critical requirement. Movement of said skimming means across the surface of the solder bath results in imparting to the layer or film of impurities a velocity substantially equivalent to that of traverse while leaving the underlying fluid in a relatively undisturbed condition.

Now making more detailed reference to the drawings and with special reference to Figure 1, there is illustrated an embodiment of the invention particularly adapted for use in mechanized dip soldering. The numeral 6 designates a vessel containing the solder bath 7, the vessel being made of material which is not wetted by solder, as for example stainless steel, thus enabling the formation of a convex meniscus 8 on the surface of the solder bath 7. It should be understood, however, that the presence of this meniscus is not basic to the invention, being shown merely as a preferred illustration. The bath of molten solder may be of any conventional composition such as 60% tin and 40% lead, and is maintained at a temperature in the neighborhood of between 400 to 600° F. On exposure of the molten solder to air, oxide accumulations are gradually formed on the surface of the aforesaid meniscus. The immersion of one surface of a printed wiring panel assembly into the solder bath, in order to simultaneously solder a plurality of connections thereon, accelerates the aforesaid normal contamination to such a degree, that to solder effectively requires the removal of surface impurities subsequent to the dip soldering of each panel. As heretofore stated the time allocated for the soldering operation is progressively diminishing as the technology of mechanization advances. As a result conventional skimming means, comprising one or more pieces of flat non-serrated sheet metal, formed so as to scoop out the oxides when traversed over the surface of the solder bath have become inadequate. The skimmer and method of operation hereafter described obviates the shortcomings of present day skimming means and techniques, and admits of high speed operation with a minimum of adjustment and a maximum of economy and reliability.

The endless chain 9 of Figure 1 is driven by the pulley 10, which is in turn driven by belt 11 connected to a motor not shown. The skimming means, designated generally by the numeral 12, is pivotally mounted to the rod 13. This rod is suspended between the parallel chains 9, one of which is shown by means of the links 14 carried by said chains. To reduce the time lag between successive skimming operations, a plurality of said skimmers are disposed at spaced intervals along the length of the chain 9. As the skimmers are advanced into skimming position by the clockwise rotation of the chain, the convex meniscus 8, formed by the surface of the solder bath 7, permits the skimming means to remove oxide accumulations formed on the surface thereof without the necessity of lowering said means from its normal path of travel. The weight of the skimming means 12 is sufficient to insure penetration of the skimming blades 15 and 16 into and through the oxide film 8. By the simple expedient of adjusting the terminal portions of the skimming blades to a level substantially coincident with the surface 17 of the vessel 6, all the steps preparatory to use are effected. This adjustment is facilitated by the slotted apertures 18 contained in the blade portions 15 and 16; the blades of course being secured to the depending element 19 by means of screws 20 and nuts 21, or by any other suitable means.

Referring to Figure 2, the skimmer designated generally by the numeral 12 comprises the tubular sleeve member 22 formed so as to provide a downwardly projecting element 19 which has depending therefrom the serrated blades 15 and 16. These blades are in spaced relation, each being serrated in staggered relation so that when viewed in composite form as in Figure 3, they present a uniquely integrated skimming device. The serrations 23 of blade 16 are positioned directly in front of the peninsular elements 24 in blade 15 and alternately the serrations 25 in the blade 15 are positioned directly in back of the peninsular elements 26 of blade 16. This labyrinth or maze of pathways defined by the alternate registration between interstices is of the essence of the present invention. This unique arrangement and design of blades, when traversing said solder bath, presents an imperforate path for the more viscous impurities while concurrently presenting a multiplicity of free flow paths for the underlying less viscous fluid. The fundamental concept underlying the operation of this unique skimming means is the ability of the less viscous liquid to conform to the sinuous paths of flow delineated by the staggered serrations and the inability of the supernatant solid or viscous impurity to conform to said flow paths. The skimming means thus results in skimming the impurities from the surface of the liquid, leaving said liquid in a relatively undisturbed condition.

Traversing of the skimmer 12 thus results in entrapment of the oxide accumulations 8 by the toothed portions 24 and 26 of blades 15 and 16 respectively. These impurities are then propelled by the skimmer, in a conglomerate mass off of the surface of the solder bath. Simultaneously with the aforesaid action of the underlying fluid solder 7, referring to Figure 4, is provided with a plurality of flow paths designated by the arrows 27 and delineated by the apertures 23 and 25 in the spaced blades 15 and 16. The spacing of the blades is, of course, dependent on the viscosity of the fluid substrate and is determined empirically once operational parameters have been established. At the completion of the skimming stroke, as indicated in phantom at 28 in Figure 1, the impurities still remaining in overlying relation to the blades and which have not been urged into the trough 29 by the aforesaid mode of operation are scooped out of the solder bath by the arcuately shaped tooth portions of the skimming blades. Disposed in interference relation with the skimming blades 15 and 16 is the brush 30 which acts to remove any remaining residue from said blades as they are carried by the belt into wiping relation therewith.

Numerous configurations embodying the teachings of the invention may be resorted to, as for example in Figure 5 the blades may be positioned in opposing relation so as to accommodate a reciprocating skimming motion, namely, one in which half of the surface is skimmed by movement in one direction, the peninsular elements 26a of the blade 16a serving to skim the dross from the surface when moved from left to right, the aperatures 23a and 25a concurrently providing free paths of flow for the fluid substrate. On reversal of the skimming direction, the peninsular elements 24a of the blade 15a serve in a capacity identical to that of the element 26a aforementioned, the composite result being the same as accomplished by the skimming means 12 of Figure 2. It is entirely possible that where the viscosity of the supernatant impurities is sufficiently high, the use of a single serrated blade would be adequate.

While a preferred embodiment, illustrative of the apparatus concepts of the present invention, has been depicted and described and has been amply illustrated, modifications may be made therein without departing from the spirit of the present invention. However, it will be understood that such changes and modifications are contemplated as come within the scope of the appended claim.

I claim:

In skimming apparatus for the removal of impurities from the surface of a body of liquid, the combination comprising: a vessel containing said liquid to be skimmed; a plurality of spaced blade-like means having downwardly presented working edge portions configured to provide a plurality of discrete skimming elements having increased skimming area with increased depth of immersion; conveyor means mounting a plurality of said blade-like means in parallel, spaced, staggered relation, the elements of one blade being disposed in alignment with the serrations of an adjacent blade and, when used in skimming, providing substantially complete coverage of the surface being skimmed; and pulley and drive means for effecting straight line traverse of said blade-like means parallel to and in contact with the surface of said body of liquid in such manner that said elements extend into and through said impurities and into said liquid short of their complete depth to provide, on movement thereof across said surface, a plurality of free flow paths for said liquid while providing a substantially imperforate obstruction to said surface impurities, thereby to effect impurity removal with minimal disturbance of the underlying liquid.

References Cited in the file of this patent

UNITED STATES PATENTS

| 287,183 | Smith | Oct. 23, 1883 |
| 305,151 | Craney | Sept. 16, 1884 |
| 621,744 | Bowden | Mar. 21, 1899 |
| 876,713 | Harden | Jan. 14, 1908 |
| 1,248,374 | Moore | Nov. 27, 1917 |
| 1,862,787 | Ennor | June 14, 1932 |
| 2,143,782 | Lewy | Jan. 10, 1939 |
| 2,334,703 | Henkel | Nov. 23, 1943 |
| 2,509,933 | Lind | May 30, 1950 |
| 2,675,575 | Dow | Apr. 20, 1954 |
| 2,713,026 | Kelly et al. | July 12, 1955 |
| 2,717,409 | Draudt | Sept. 13, 1955 |

FOREIGN PATENTS

| 729,508 | Great Britain | May 4, 1955 |